United States Patent
Kim et al.

(10) Patent No.: US 9,652,656 B2
(45) Date of Patent: May 16, 2017

(54) METHOD AND APPARATUS FOR GENERATING ORGAN IMAGE

(75) Inventors: Yong-sun Kim, Yongin-si (KR); Jung-bae Kim, Hwaseong-si (KR); Young-kyoo Hwang, Seoul (KR); Won-chul Bang, Seongnam-si (KR); Do-kyoon Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 802 days.

(21) Appl. No.: 13/544,859

(22) Filed: Jul. 9, 2012

(65) Prior Publication Data
US 2013/0051645 A1    Feb. 28, 2013

(30) Foreign Application Priority Data
Aug. 29, 2011  (KR) .......... 10-2011-0086695

(51) Int. Cl.
    *G06K 9/00*     (2006.01)
    *G06T 5/50*     (2006.01)
(52) U.S. Cl.
    CPC ........... *G06K 9/00* (2013.01); *G06T 5/50* (2013.01); *G06T 2207/10072* (2013.01); *G06T 2207/30056* (2013.01)
(58) Field of Classification Search
    USPC ....... 382/100, 128, 129, 130, 131, 132, 133; 128/922; 378/4–27
    See application file for complete search history.

(56) References Cited

U.S. PATENT DOCUMENTS

| | | | | |
|---|---|---|---|---|
| 4,689,670 A  * | 8/1987 | Okazaki | .................. | 378/98.5 |
| 5,457,754 A  * | 10/1995 | Han et al. | ............ | 382/128 |
| 5,570,430 A  * | 10/1996 | Sheehan et al. | ......... | 382/128 |
| 6,240,201 B1 * | 5/2001 | Xu et al. | ............. | 382/130 |
| 7,194,117 B2 * | 3/2007 | Kaufman et al. | ......... | 382/128 |
| 8,111,895 B2 * | 2/2012 | Spahn | ............... | 382/132 |
| 8,213,699 B2 * | 7/2012 | Wakai et al. | ............ | 382/131 |
| 8,218,835 B2 * | 7/2012 | Matsuda et al. | ......... | 382/128 |
| 8,447,090 B2 * | 5/2013 | Wakai et al. | ............ | 382/131 |
| 8,750,584 B2 * | 6/2014 | Matsuba et al. | ......... | 382/128 |
| 2003/0099388 A1 * | 5/2003 | Doi et al. | ............. | 382/131 |
| 2006/0110018 A1 * | 5/2006 | Chen et al. | ............ | 382/130 |
| 2009/0010519 A1 * | 1/2009 | Wakai | ............... | G06F 19/321 |
| | | | | 382/131 |
| 2009/0080743 A1 * | 3/2009 | Launay et al. | .......... | 382/131 |
| 2009/0092301 A1 | 4/2009 | Jerebko et al. | | |
| 2010/0128946 A1 | 5/2010 | Fidrich et al. | | |
| 2011/0019886 A1 * | 1/2011 | Mizuno | .............. | 382/128 |
| 2011/0142308 A1 * | 6/2011 | Ishikawa et al. | ........ | 382/128 |

(Continued)

FOREIGN PATENT DOCUMENTS

| | | |
|---|---|---|
| JP | 2010-119850 A | 6/2010 |
| KR | 10-2008-0096104 A | 10/2008 |
| KR | 10-2010-0071595 A | 6/2010 |

*Primary Examiner* — Anand Bhatnagar
(74) *Attorney, Agent, or Firm* — NSIP Law

(57) ABSTRACT

A method and apparatus for generating an organ image are provided. An organ image generating method involves: receiving image data of a medical image of a subject; extracting an image of an organ from the medical image; receiving image data of a generic image of the organ; and generating image data of an organ image of the subject from the generic image of the organ and the extracted image of the organ.

16 Claims, 10 Drawing Sheets

(56) References Cited

U.S. PATENT DOCUMENTS

| | | | |
|---|---|---|---|
| 2011/0243403 A1* | 10/2011 | Mizuno | 382/128 |
| 2011/0311116 A1* | 12/2011 | Benn | G06T 11/00 |
| | | | 382/128 |
| 2012/0101368 A1* | 4/2012 | Masumoto | 600/420 |
| 2012/0195485 A1* | 8/2012 | Matsuba et al. | 382/131 |
| 2013/0208970 A1* | 8/2013 | Fujisawa | 382/131 |
| 2013/0303885 A1* | 11/2013 | Hoshino et al. | 600/419 |
| 2014/0247970 A1* | 9/2014 | Taylor | 382/128 |

* cited by examiner

METHOD AND APPARATUS FOR GENERATING ORGAN IMAGE

CROSS-REFERENCE TO RELATED APPLICATION(S)

This application claims the benefit under 35 U.S.C. §119 (a) of Korean Patent Application No. 10-2011-0086695, filed on Aug. 29, 2011, in the Korean Intellectual Property Office, the entire disclosure of which is incorporated herein by reference for all purposes.

BACKGROUND

1. Field

The following description relates to a method and apparatus for generating an organ image, and, for example, to a method and apparatus for generating an organ image of an organ in a patient's body from an image of the internal body of the patient.

2. Description of Related Art

Recently, various medical imaging devices have been developed and used for diagnosing patients. Medical imaging devices, such as a computed tomography apparatus (CT) or a magnetic resonance imaging apparatus (MRI) allow a physician to view the internal parts of a patient's body without making incisions, resulting in a speedy diagnosis while avoiding the invasiveness and inconvenience of traditional diagnostic methods.

In line with the rapid development of medical imaging devices, imaging devices that output three-dimensional (3D) images as well as two-dimensional (2D) images have appeared. However, the medical imaging devices may provide limited contrast between specific organs or structures within a region of a patient's body. Further, a physician may occasionally benefit from viewing just one or two organs or structures within the region.

SUMMARY

In one general aspect, there is provided an organ image generating method involving: receiving image data of a medical image of a subject; extracting an image of an organ from the medical image; receiving image data of a generic image of the organ; and generating image data of an organ image of the subject from the generic image of the organ and the extracted image of the organ.

The extracting of the image of the organ may involve: extracting an image comprising a boundary between an inner area and an outer area of the organ from the medical image; and extracting organ internal structure information of at least one internal structure of the organ from the medical image.

The generating of the image data of the organ image of the subject may involve generating image data of the organ image of the subject from the generic image, the extracted image of the organ, and the extracted organ internal structure information.

The extracting of the organ internal structure information may further involve extracting anatomical characteristic information showing an anatomical characteristic of the organ based on the organ internal structure information, and the generating of image data of the organ image of the subject may further involve generating image data of the organ image of the subject from the generic image based on the extracted organ internal structure information and the extracted anatomical characteristic information.

The generating of image data of the organ image of the subject may involve: generating an initial organ image of the subject from the generic image based on the extracted image of the organ; and generating image data of the organ image from the initial organ image in consideration of a difference in morphological characteristic between the organ of the subject and the initial organ image.

The generating of the image data of the organ image from the initial organ image may involve generating image data of the organ image from the initial organ image based on a distance between at least one of a plurality of points included in the initial organ image and at least one of a plurality of points included the extracted image.

The generating of the image data of the organ image from the initial organ image may involve generating image data of the organ image from the initial organ image based on a correspondence relationship between at least one internal structure included in the initial organ image and at least one internal structure included in the extracted image.

The generating of the image data of the organ image from the initial organ image may involve generating image data of the organ image from the initial organ image based on elasticity information of at least one point included in the initial organ image.

The elasticity information may involve an elasticity of each tissue of an organ corresponding to at least one point included in the initial organ image.

The generic image may be determined from a plurality of sample image data according to statistical modeling method.

The organ image generating method may further involve: extracting an image of a lesion inside the organ from the medical image; and generating image data of a lesion image from the organ image and the extracted image of lesion.

The organ image generating method may further involve generating the organ image with the lesion image based on image data of the organ image and image data of the lesion image.

The generating of the image data of a lesion image may further involve generating the lesion image based on elasticity information of at least one point on the organ image and elasticity information of at least one point on the lesion image.

In another aspect, there is provided an organ image generating method involving: receiving image data of a medical image of a subject; extracting an image of an organ from the medical image; extracting an image of a lesion inside the organ from the medical image; generating image data of an organ image of the subject based on the extracted image of the organ; and generating image data of a lesion image based on the organ image and the extracted image of lesion.

A non-transitory computer-readable recording medium storing a computer program may be configured to cause a computer to execute the above described methods.

In another aspect, there is provided an organ image generating apparatus including: an input unit configured to receive image data of a medical image of a subject; an image processor configured to extract an image of an organ from the medical image and to generate image data of an organ image of the subject from a generic image of the organ based on the extracted image of the organ; and an output unit configured to output image data of the organ image.

The input unit may further be configured to receive image data of the generic image of the organ that is determined from a plurality of sample image data, and the image processor may include: an organ image extracting unit configured to extract an image of an organ from the medical image; and an organ image generating unit configured to generate image data of an organ image of the subject from the generic image based on the extracted image of the organ.

The input unit may be further configured to receive a plurality of sample image data, and The image processor may include: an organ image extracting unit configured to extract an image of an organ from the medical image; a generic image generating unit configured to generate image data of the generic image of the organ from the plurality of sample image data; and an organ image generating unit configured to generate image data of the organ image of the subject from the generic image and the extracted image of the organ.

The input unit may be configured to receive the image data from an imaging unit comprising an MRI, a CT, or an ultrasound scanner.

The output unit may include an electronic display screen.

The electronic display screen may be configured to display the organ image without displaying other tissues or organs in the medical image.

The organ image may include an image of an internal structure of the organ.

The image of the internal structure of the organ may include an image of a blood vessel, an air sac, an air path, a lymph node, a bone, lobes or a type of tissue.

The organ image may include an image of a lesion.

The image of the lesion may include an image of a tumor, a cyst, a calcified tissue, a blister, a thrombosis, or a blockage in a blood vessel or an air pathway.

Other features and aspects may be apparent from the following detailed description, the drawings, and the claims.

Figure 1:
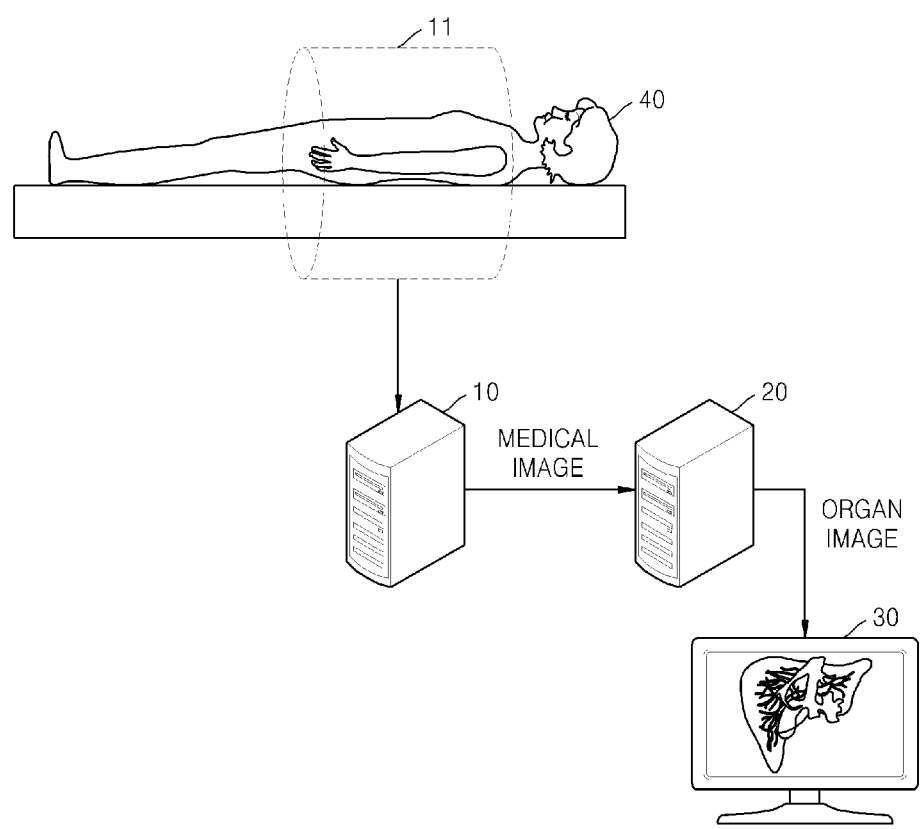
FIG. 1 illustrates an example of a medical imaging system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Further, descriptions of well-known functions and constructions may be omitted for increased clarity and conciseness. Likewise, repetitive detailed descriptions of the same elements, features, structures, units, apparatuses and operations may be omitted for increased clarity and conciseness.

With the rapid development of medical imaging devices, imaging devices that output three-dimensional (3D) images in addition to two-dimensional (2D) images have appeared. However, the medical imaging devices may provide limited contrast between specific organs or structures within a region of a patient's body for a rapid diagnosis. Further, a physician may occasionally benefit from viewing just one or two organs or structures within the region. In addition, organs may change their positions during a surgery, and a method of determining their precise positions within the body may be useful to physicians.

Thus, a physician may benefit from a technology that extracts an organ image of internal parts of a patient's body based on images obtained from a medical imaging device. An organ image that accurately reflects the structural characteristics of actual organs of an individual patient may further facilitate patient diagnosis.

FIG. 1 illustrates an example of a medical imaging system. Referring to FIG. 1, the medical imaging system includes a medical image generating apparatus 10, an organ image generating apparatus 20, and an image displaying apparatus 30. The medical image generating apparatus 10 generates image data of a medical image showing internal organs and structures of a subject 40. In this example, the medical image generating apparatus 10 may include one or more medical devices for viewing the internal parts of a subject, such as ultrasound diagnostic equipment, a computed tomography apparatus (CT), a magnetic resonance imaging apparatus (MRI), or the like.

In an example, the medical image generating apparatus 10 includes an MRI. In such an example, the medical image generating apparatus 10 generates an image based on data corresponding to the differences in signals received from various tissues of the subject 40 as the subject enters a magnetic field generating structure 11 that raises nuclei of atoms in the body of the subject 40 to a high-frequency state, causing hydrogen nuclei to resonate at different wavelengths. In other example, the medical image generating apparatus 10 includes ultrasound diagnostic equipment. In such a medical image generating apparatus 10, reflection signals are used to generate image data of volume images showing an internal region of the patient to be examined. The reflection signals are generated by transmitting source signals generated from a probe installed in the medical image generating apparatus 10 to the internal region of the body of the patient to be examined. Thus, various source signals may be used with the medical image generating apparatus 10.

The types of source signals that may be used with the medical image generating apparatus 10 to obtain image data include, for example, ultrasound, x-rays, and the like. The image generated by the medical image generating apparatus 10 may also include various types of images, such as an ultrasound image, a radiation image, an MRI image, and the like. Thus, the images that may be used with the medical image generating apparatus 10 are not limited to a single-type of image such as an MRI image or a CT image.

The image generated by the medical image generating apparatus 10 shows internal organs and structures of a subject 40. In general, the images of internal organs and structures of a patient may appear significantly different based on the type of imaging technology used by the medical image generating apparatus 10. For example, in the event that the imaging technology utilized by the medical image generating apparatus 10 is an MRI, the image generated by the medical image generating apparatus 10 may show a cross-section of the internal body of the subject 40. Alternatively, in the event that the imaging technology utilized by the medical image generating apparatus 10 is ultrasound diagnostic equipment, the image generated by the medical image generating apparatus 10 may show outer contours or shapes of a predetermined area of the body that is observed. Likewise, the image may be embodied as a 2D image or a 3D image. In other words, the image may show a cross-section of the internal body of the subject 40, or a shape of a predetermined area of the body of the subject 40, and the image may be a 2D image that includes an x-axis and a y-axis or a 3D image that includes an x-axis, a y-axis, and a z-axis.

The image generated by the above-described method may include all internal parts found in a selected area of the body of the subject 40. The internal parts include both organs and tissues found in the body of the subject 40. For example, an image showing a cross-section of an abdomen of the subject 40 may include cross-sections of skin, bones, and organs of the subject 40. Alternatively, an image showing an area around the uterus of the subject 40 may include the uterus, amniotic fluid in the uterus, and a fetus. However, a medical professional, such as a physician, occasionally benefit from an image showing only a specific part of a patient's internal body.

For example, in order to effectively diagnose a patient who has an abnormal liver symptom, a medical professional may benefit from a precise image that shows only the patient's liver. Accordingly, a medical professional may benefit from an imaging system that displays an image of only a specific part of the internal body of the subject 40, distinguished from other parts of the internal body. For example, an organ image showing a specific organ of the internal body of the subject 40 may be useful in diagnosing health issues related to the specific organ. Such an organ image may be generated from an image that depicts a cross-section of all components of the internal body of the subject 40.

In general, an organ image shows one organ from the organs and structures included in an image generated by the medical image generating apparatus 10. For example, when the image is an MRI image showing a cross-section of the abdomen of the subject 40, an organ image may show only one organ among skin, bones, organs, and blood vessels that are present in the abdomen area. For instance, the organ image may show an internal structure and a lesion included in the organ as well as an outer contour, boundary or circumference of the organ. For example, when the organ image is an organ image showing a liver, the organ image may show an internal structure of the liver, such as different lobes of the liver or blood vessels in the liver, and a lesion, such as a cyst, calcification, or a tumor, as well as a boundary of the liver. Examples of lesions that may be found in other organs include a tumor, a cyst, a calcified tissue, a blister, a thrombosis, or a blockage in a blood vessel or an air pathway. In particular, the organ image may show an internal structure of an organ and a lesion inside the organ as well as a boundary between the specific organ and other internal organs and structures of the subject 40 to increase the accuracy and efficiency in diagnosing a patient. The various examples described below provide examples of methods of generating an organ image showing a predetermined organ of the internal body of the subject 40 from a medical image generated by the medical image generating apparatus 10.

Figure 2:
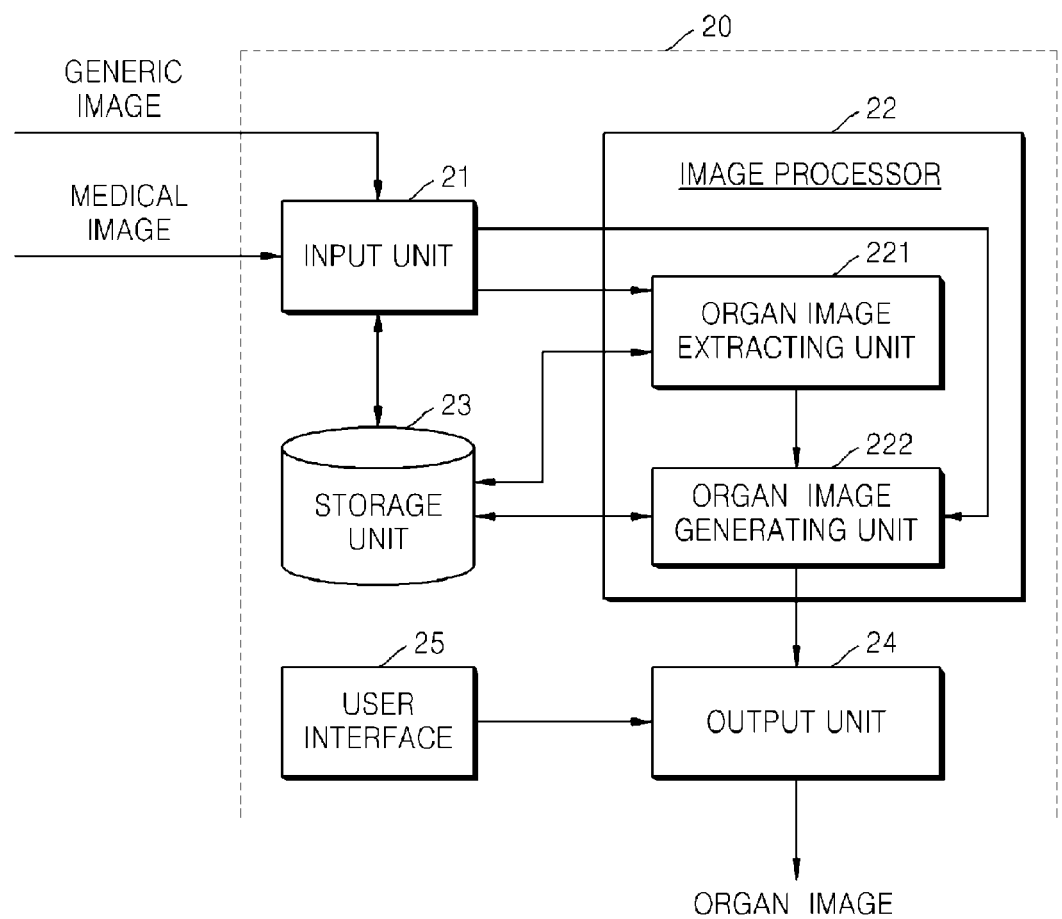
FIG. 2 is a diagram illustrating an example of an organ image generating apparatus illustrated in FIG. 1.

FIG. 2 illustrates an example of an organ image generating apparatus 20, according to the example of medical imaging system illustrated in FIG. 1. Referring to FIG. 2, the organ image generating apparatus 20 includes an input unit 21, an image processor 22, a storage unit 23, an output unit 24, and a user interface 25. The organ image generating apparatus 20 illustrated in FIG. 2 is provided as an example only, and its components may be modified in various ways. Further, the medical image generating apparatus 10 and the organ image generating apparatus 20 may be combined into one apparatus.

Referring to FIG. 2, the input unit 21 receives image data for producing a medical image showing the internal body of the subject 40 from a medical image generating apparatus 10. The image data may include data for producing various types of images, such as an ultrasound image, a radiation image, an MRI image, and the like. In other words, the image processed by the organ image generating apparatus 20 is not limited to a single-type of image such as an MRI image or a CT image. In addition, an image may depict internal parts of the body differently, according to the type of imaging technology used by the medical image generating apparatus 10. For example, when the medical image generating apparatus 10 is an MRI, an image generated by the medical image generating apparatus 10 may show a cross-section of the internal body of the subject 40. Also, the image may be embodied as a 2D image or a 3D image. The image may show a cross-section of the internal body of the subject 40, or a shape of a predetermined area of the body of the subject 40 as a 2D image. The image maybe a 2D including an x-axis and a y-axis, or a 3D image including an x-axis, a y-axis, and a z-axis.

In general, an image obtained from a medical image generating apparatus 10 includes all internal parts found in the observed area of the body of the subject 40. Hereinafter, internal parts refer to organs, tissues and other structures inside the body of the subject 40. For example, an image showing a cross-section of an abdomen may include cross-sections of skin, bones, and organs present in the abdomen of the subject 40.

In the example depicted in FIG. 2, the input unit 21 may transmit the image received from the medical image generating apparatus 10 to an image processor 22.

According to this example, the input unit 21 receives a generic image. The input unit 21 may receive a generic image from the medical image generating apparatus 10 or an external apparatus. The generic image refers to a representative image showing a specific organ of the internal body. For example, the generic image may refer to a representative image of a liver. As an example, the generic image may be derived from a plurality of sample image data by applying a statistical learning method. The sample image data may include images of the organ from individuals other than the subject, images of the organ of the subject taken in the past, generic 2D or 3D graphical representation of the organ, and the like. A statistical learning method may refer to a statistical modeling method.

A statistical learning method refers to generating a representative image based on a plurality of sample image data. Examples of a statistical learning method include an active shape model (ASM), an active appearance model (AAM), a statistical shape model (SSM). The ASM refers to a statistical model of the shape of objects that are repeatedly deformed to show a representative image of the object in a new image. The AAM refers to a computer image algorithm for matching a statistical model of object shape and appearance to a new image. The SSM refers to a geometrical analysis from a set of statistical shapes that are measured to describe geometrical properties from similar shapes or different groups. The ASM, the AAM, and the SSM are not limited to the above-described definitions.

The generic image may be comprised of a base vector represented by a mean shape and a variation. In other examples, the generic image may be comprised of a mesh model, and the mean shape may be comprised of the mesh mode. In general, the mesh model refers to a model image that is represented by vertices, edges, and surfaces such as a triangle. Also, as described above, the generic image may be obtained from a plurality of sample image data.

The generic image may be formed such an internal structure of an organ as well as an outer boundary of the organ are included in the image. The generic image may further include information regarding an outer boundary, information regarding an internal structure, or anatomical characteristic information regarding an organ and the internal structure. Information regarding the outer boundary of an organ or a structure, information regarding the internal structure, and information regarding the anatomical characteristics of organs and internal structures are semantic information; thus, one or more of the semantic information may be included in image data of the generic image.

So far, an example in which the input unit 21 receives a generic image from outside has been described. According to another example, the input unit 21 may directly generate a generic image from a plurality of sample image data that are input from outside or stored in a storage unit 23 of the organ image generating apparatus 20.

The output unit 24 outputs image data of an organ image generated from an image by the image processor 22 to the image displaying apparatus 30. The output unit 24 may be a type of interface for connecting the image processor 22 and the image displaying apparatus 30, and the input unit 21 may be a type of interface for connecting the medical image generating apparatus 10 and the image processor 22. The image displaying apparatus 30 may display the organ image, using the image data of the organ received from the output unit 24. As an example, the image displaying apparatus 30 may be an apparatus for displaying the organ image on a screen or a paper. The screen may be an LCD screen, a monitor, a projection on the wall, and the like. In other examples, the image displaying apparatus 30 may output the image to a printed paper. Examples of the image displaying apparatus are not limited to these examples, and include other devices that allow visualization of the organ image.

The storage unit 23 stores various data generated by the image processor 22 during image processing. For example, the storage unit 23 may store image data of the input image, image data of the generic image, an image of an organ extracted from the medical image, and image data of the organ image transmitted to the output unit 24. Also, according to various examples provided herein, the storage unit 23 may store data such as information regarding an organ, information regarding an internal structure, or information regarding anatomical characteristic of an organ or a structure. Examples of the storage unit 23 include a hard disc drive, a read only memory (ROM), a random access memory (RAM), a flash memory, a memory card, and the like.

The user interface 25 may be an interface for receiving certain commands or information from a user, for example, a medical professional. The user interface 25 may be an input device such as a keyboard or a mouse, or may be a graphical user interface (GUI) displayed on a screen of the image displaying apparatus 30.

The image processor 22 extracts an image showing a predetermined organ of the internal body of the subject 40 from the medical image. Also, the image processor 22 generates image data of the organ image of the subject 40 from the generic image based on the extracted image. The image data of the medical image and the image data of the generic image may be directly transmitted from the input unit 21, or may be previously stored in the storage unit 23 via the input unit 21 and then transmitted from the storage unit 23.

Referring to FIG. 2, the image processor 22 includes an organ image extracting unit 221 and an organ image generating unit 222. The image processor 22 may include one or more dedicated chips for performing the functions of the above-described components, or may be configured as a general-purpose central processing unit (CPU) with a dedicated program stored in the storage unit 23.

The organ image extracting unit 221 extracts an image showing a predetermined organ of a subject 40. Examples of the medical image include an MRI image, an ultrasound image, a CT image, a positron emission tomography (PET) image, and the like, that show the internal body of the subject 40. Also, an image showing an organ includes an image showing only a portion of a predetermined organ from the medical image. For example, when the organ is a liver, an image showing the organ may refer to an image showing an inner area of the liver and a boundary between the inner area and an outer area of the liver. The organ image extracting unit 221 may determine the boundary of the organ before extracting the image directed to the predetermined organ from the medical image. In one example, the organ image extracting unit 221 may determine the boundary of the organ from the medical image by analyzing the medical image. For instance, when the organ included in the image is a liver, the organ image extracting unit 221 may extract an image showing the liver from the medical image by analyzing the medical image that includes the liver and other tissues and organs. To extract the image of the liver, the organ image extracting unit 221 may use sample data transmitted from the storage unit 23 to analyze the medical image or perform a learning process involving a repetitive operation. The learning process involving a repetitive operation refers to a process of identifying an image showing the liver from the input medical image by continuously performing an operation with respect to the image of the liver.

The organ image extracting unit 221 may determine the organ of interest, or a predetermined organ, based on a default value or a command that a user input via a user interface 25. For example, when the default value or the command from the user interface 25 indicates that the organ of interest is a liver, the organ image extracting unit 221 may extract an image showing the liver from the medical image. In this example, the command provided from the user interface 25 may include region information that a user provided via the user interface 25. The region information refers to geometric information defining a region of the body that is provided by the user. For example, when a user inputs a region indicating the liver from the medical image through the user interface 25, information regarding the area selected by the user may be transmitted to the organ image extracting unit 221. In response, the organ image extracting unit 221 may extract an image showing the selected organ from the medical image based on the region information provided by the user. According to an example, a user may specify the region by using a region growing method after selecting a part of the region in a medical image displayed on a display screen via the user interface 25. In another example, the user may specify the region by using a graph cut method by selecting an organ from an image that includes other internal organs and tissues. In the graph cut method, a user may select an area on the display screen as a seed region, and the region of interest may be determined by using a probability distribution with respect to the seed region and information regarding a distance between each point in the medical image and the seed region, considering the smoothness of transition with respect to color, brightness, contrast and other visual information between neighboring points. In this example, if the medical image is a 2D image, each point may correspond to a pixel. If the medical image is a 3D image, the each point may correspond to a voxel.

The organ image extracting unit 221 may perform an organ region dividing operation as an initial operation for determining a position and a direction of an organ. When the position and the direction of the organ may be predicted through a relative relationship between the organ and structures around the organ, the organ image extracting unit 221 may determine the position and the direction of the organ without performing the organ region dividing operation.

The organ image generating unit 222 generates an organ image of the subject 40 from a generic image. The generic image, as described above, may refer to a representative image showing a specific organ of an individual patient. For example, the generic image may be a representative image of a liver of a subject 40. In one example, a generic image may be provided to the organ image generating unit 222 via an input unit 21. However, in other example, the generic image may be generated by a module included in an image processor 22.

The organ image generating unit 222 may generate an organ image of the subject 40 from a generic image based on an image extracted from a medical image of the subject 40. In such a case, the extracted image reflects an actual characteristic of a selected organ of the subject 40. In conclusion, the organ image generating unit 222 may generate an organ image that reflects an actual characteristic of the organ of an individual patient by obtaining the organ image from a medical image of the subject 40. For example, when the selected organ is a liver, the organ image generating unit 222 may reflect the specific characteristics of the liver of the subject 40 by generating the organ image of the liver based on a generic image obtained from an image of the subject's liver extracted from a medical image. Characteristics of an organ of a subject 40 may include a morphological characteristic of the organ, a characteristic of an internal structure of the organ, anatomical characteristics of the organ and the internal structure of the organ, a characteristic of a lesion included in the organ, and the like. Hereinafter, operations of the organ image generating unit 222 are described in detail.

Figure 3:
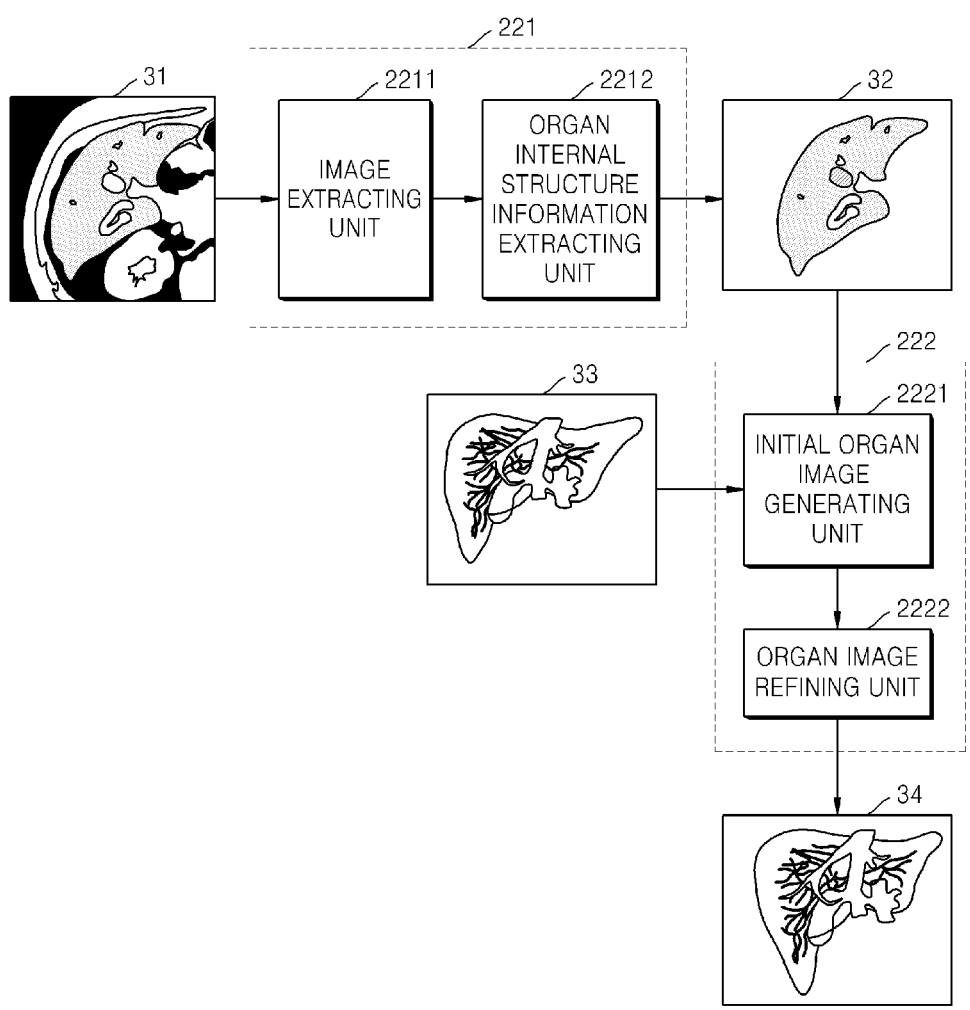
FIG. 3 is a diagram illustrating an example of an organ image extracting unit and an example of an organ image generating unit.

FIG. 3 illustrates the operation of an example of an organ image extracting unit 221 and an example of an organ image generating unit 222, according to the medical imaging system illustrated in FIG. 2. Referring to FIG. 3, the organ image extracting unit 221 includes an image extracting unit 2211 and an organ internal structure information extracting unit 2212. The organ image generating unit 222 includes an initial organ image generating unit 2221 and an organ image refining unit 2222. The image extracting unit 2211 extracts an image showing an organ of a subject 40 from a medical image. Hereinafter, an example in which the medical image is an MRI image is described. For convenience, a medical image refers to an MRI image including a part of or an entire liver of a patient for this example.

As illustrated in FIG. 3, an image of an organ extracted from the medical image 31 may be an image 32 of a liver. In this example, a generic image is a generic image 33 of a liver, and an organ image refers to an organ image 34 of the liver. The image of liver is provided simply as an example, and other organs, tissues or structures may be viewed in other examples. For example, the selected organ may be a kidney, a lung, a heart, a bone or the like in other examples. According to this example, the image extracting unit 2211 extracts a liver image 32 of the subject 40 from a medical image 31; the image extracting unit 2211 may generate image data of the image 32 showing the liver of the subject 40 from image data of the medical image 31.

The image extracting unit 2211 may extract an image 32 that includes a boundary of an organ from the medical image 31 or data of the medical image 31. A boundary refers to the boundary between an inner region and an outer region of an organ. In the example illustrated in FIG. 5, the image 32 includes a boundary 321 between an internal region and an outer region of a liver. An inner region and an outer region of an organ may be defined in the same manner as in extracting the image of an organ by the organ image extracting unit 221, as described above. Thus, the description will not be repeated here for conciseness.

The organ internal structure information extracting unit 2212 may extract an image of at least one internal structure of an organ from the medical image 31. The organ internal structure information extracting unit 2212 may also generate internal structure information for defining the internal structure. The organ internal structure information extracting unit 2212 may put the internal structure and the internal structure information into the image data of the image 32 showing the organ. The internal structure information is semantic information, and the semantic information may be included in the form of data in the image data of the image 32 showing the organ or may be stored in the storage unit 23.

In the example depicted in FIG. 3, the organ internal structure information extracting unit 2212 extracts the image of at least one internal structure of the selected organ. For example, when the selected organ is a liver, the organ internal structure information extracting unit 2212 may extract blood vessels in the liver as an internal structure and may extract data for defining the blood vessel as internal structure information. The data for defining the blood vessels may refer to data including positions, directions, shapes, or the like, of the blood vessels. Alternatively, when the organ is a kidney, the organ internal structure information extracting unit 2212 may extract medullary substances, cortical substances, blood vessels, or the like as an internal structure and may extract data for defining the medullary substances, the cortical substances, or the blood vessels as internal structure information.

The organ internal structure information extracting unit 2212 may use an algorithm for extracting the internal structure. For example, the organ internal structure information extracting unit 2212 may extract the images of blood vessels in a liver as the internal structure by using a clustering method. In certain medical images, blood vessels are shown as a bright structure in a contrast image. Thus, the organ internal structure information extracting unit 2212 may cluster points (for example, pixels or voxels) having certain brightness values or specific color values in order to extract an image of the blood vessels in the liver as the internal structure. Also, the organ internal structure information extracting unit 2212 may remove clustering noise by applying the fact that blood vessels generally have cylindrical shapes. Also, according to another example, the organ internal structure information extracting unit 2212 may further extract an image showing the liver and organ information for defining the liver. The organ information may include information for defining a position, a direction, or a shape of the liver.

According to another example, the organ internal structure information extracting unit 2212 extracts anatomical characteristic information based on internal information regarding the organ. The anatomical characteristic information refers to information regarding an anatomical characteristic of at least one of an organ and internal structures of the organ. For example, in the event that a liver is selected as the organ of interest, the organ internal structure information extracting unit 2212 may extract a shape of the liver or lobes of the liver partitioned by blood vessels as an anatomical characteristic and may extract anatomical characteristic information for defining the anatomical characteristic. The lobes of a liver partition the liver morphologically or structurally. The lobes of the liver include a right lobe and a left lobe, and a quadrate lobe and a caudate lobe that are positioned between the right lobe and the left lobe. The anatomical characteristic information may additionally include data regarding a position, a direction, a shape, or the like of the lobes of the liver. As described above, anatomical characteristic information is semantic information. Semantic information may be included in the form of data in image data of the image 32 showing an organ or may be stored in the storage unit 23. Also, the organ internal structure information extracting unit 2212 may use reference information having a tree shape that is previously learned from a plurality of pieces of data in order to extract the lobes of the liver as an anatomical characteristic.

Alternatively, the organ internal structure information extracting unit 2212 may extract branches of blood vessels, which are internal structures of a liver, as an anatomical characteristic, and may extract anatomical characteristic information for defining the anatomical characteristic. The branches of blood vessels may include locations where the blood vessels split into smaller vessels. The anatomical characteristic information may include data regarding positions, directions, shapes, or the like of the blood vessels, including the branch points of the vessels. As described above, the anatomical characteristic information is semantic information; as such, the anatomical characteristic information may be included in the form of data in image data of the image 32 showing an organ or may be stored in the storage unit 23 as semantic information. In addition, the organ internal structure information extracting unit 2212 may detect parts where the blood vessels are morphologically changed as the blood vessels splits to extract the branching points of the blood vessels as an anatomical characteristic. Since the blood vessels generally have cylindrical shapes, locations where the cylindrical shapes are changed may be extracted as branching points of the blood vessels. Alternatively, when the organ is a kidney, the organ internal structure information extracting unit 2212 may extract a local minimum or a local maximum of a boundary between a medullary substance and a cortical substance included in the kidney or branches of blood vessels in the kidney as an anatomical characteristic.

Figure 4:
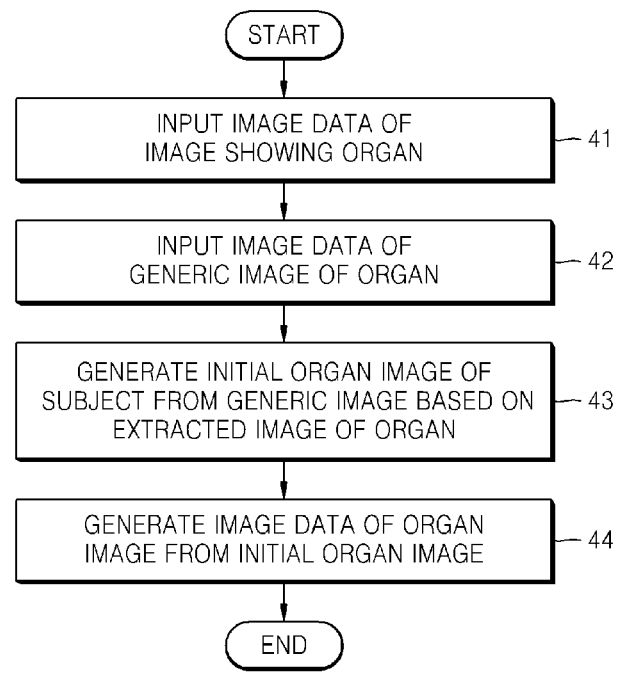
FIG. 4 is a flowchart illustrating an example of a process of generating image data of an organ image, using an initial organ image generating unit and an organ image refining unit illustrated in FIG. 3.

FIG. 4 illustrates a flowchart of an example of a process for generating image data of an organ image, using the initial organ image generating unit 2221 and the organ image refining unit 2222 illustrated in FIG. 3. Referring to FIG. 4, the process of generating image data includes operations 41 to 44. In one example, operations 41 to 43 are performed by the initial organ image generating unit 2221, and operation 44 is performed by the organ image refining unit 2222. Referring to FIGS. 3 and 4, in operation 41, the initial organ image generating unit 2221 receives image data of the image 32 showing an organ. Here, the initial organ image generating unit 2221 may receive the image data of the image 32 showing an organ from the input unit 21 or may extract the image data from the storage unit 23. The image data of the image 32 showing an organ may further include at least one of image data of an internal structure of the organ, image data of morphological characteristics of the organ or the internal structure, information regarding the organ, information regarding the internal structure, and anatomical characteristic information.

Referring to FIGS. 3 and 4, in operation 42, the initial organ image generating unit 2221 receives a generic image 33. The initial organ image generating unit 2221 may receive the generic image 33 from the input unit 21 or extract the generic image 33 from the storage unit 23. The generic image 33, as described above, may refer to a representative image showing a specific organ of the internal body. For example, the generic image 33 may be a representative image of a generic liver. The generic image 33 may be obtained by applying a statistical learning method to a plurality of sample image data. One example of the statistical learning method is a statistical modeling method.

Referring to FIGS. 3 and 4, in operation 43, the initial organ image generating unit 2221 generates an initial organ image from the generic image 33. The initial organ image generating unit 2221 generates the initial organ image from the generic image 33 based on the extracted image 32. In other words, the initial organ image generating unit 2221 reflects a morphological characteristic of an organ of the subject 40 to the generic image 33 to generate the initial organ image of the subject 40. For example, the initial organ image generating unit 2221 may extract a morphological characteristic of an organ of the subject 40 as a parameter and may generate an initial organ image from the generic image 33 based on the parameter. The morphological characteristic of the organ may be included information regarding the organ as described above, and the morphological characteristic may be a position, a direction, or the like of the organ.

As described above, the generic image 33 may include a base vector represented by a mean shape and a variation. According to an example, the initial organ image generating unit 2221 may position the organ at a mean shape by setting information regarding the position and the direction of the organ to a default value and may calculate a displacement at each point (for example, each vertex) in a normal direction based on the mean shape to update the mean shape and a variation of the generic image 33, thereby generating the initial organ image. In this example, a result of the updating of the mean shape and the variation of the generic image 33 is converged when the displacement at each point (for example, each vertex) is minimum, and the convergence may act as a limitation of the initial organ image. According to another example, the initial organ image generating unit 2221 may generate the initial organ image by using at least one of: an image showing an internal structure of the organ, information regarding the internal structure of the organ, an image showing an anatomical characteristic of the organ, and anatomical characteristic information regarding the organ. However, even when the initial organ image generating unit 2221 does not include at least one of the image showing the internal structure of the organ, the information regarding the internal structure of the organ, the image showing the anatomical characteristic of the organ, and the anatomical characteristic information regarding the organ in the initial organ image, the initial organ image may include an external structure of the organ, the internal structure of the organ, the anatomical characteristic of the organ, and the like.

Figure 5:
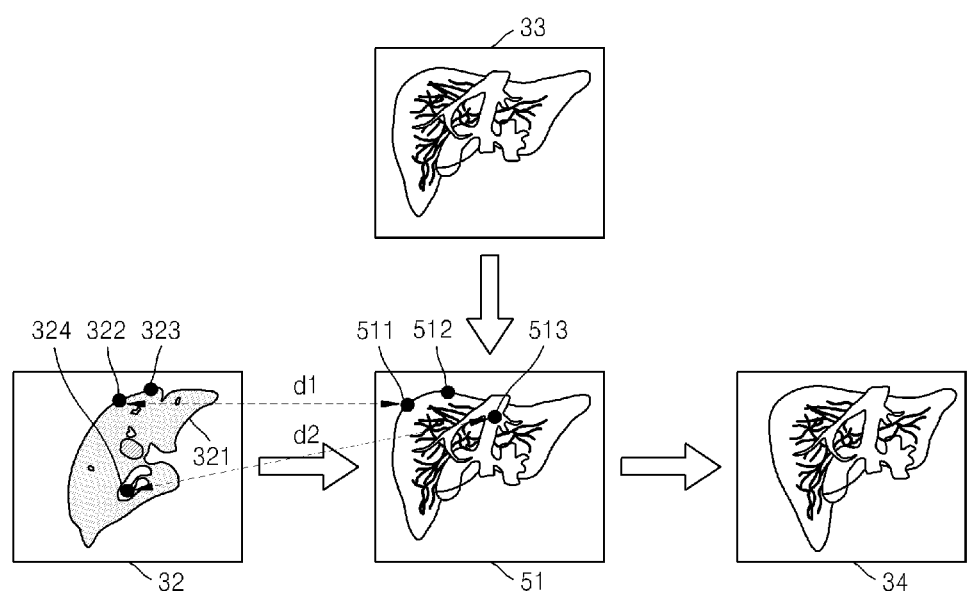
FIG. 5 is a diagram illustrating an example of a process of generating an organ image from an initial organ image, using an organ image refining unit illustrated in FIG. 3.

Referring to FIGS. 3 and 4, in operation 44, the organ image refining unit 2222 generates image data of the organ image 34 from the initial organ image. For example, the organ image refining unit 2222 may generate the image data of the organ image 34 from the initial organ image in consideration of a difference in morphological characteristic between the organ of the subject 40 and the initial organ image; for instance, the organ image refining unit 2222 may generate the image data of the organ image 34 from the initial organ image in consideration of a morphological difference between the image 32 showing the organ of the subject 40 and the initial organ image. For example, even though the initial organ image is generated from the generic image 33 based on the image 32 extracted by the initial organ image generating unit 2221, when there is a difference between the initial organ image and the extracted image 32, the organ image refining unit 2222 may generate the image data of the organ image 34 in consideration of the morphological difference between the image 32 showing the organ of the subject 40 and the initial organ image in order to minimize the variation. FIG. 5 illustrates an example of an operation of the organ image refining unit 2222 that minimizes the variation. Such an operation may be a part of the refining process, to obtain an organ image 34.

FIG. 5 illustrates an example of a process of generating the organ image 34 from an initial organ image 51 by using the organ image refining unit 2222 of FIG. 4. In this example, the organ image refining unit 2222 generates the image data of the organ image 34 from the initial organ image 51 based on a distance between at least one of a plurality of points included in the initial organ image 51 and at least one of a plurality of points included the extracted image 32. The plurality of points included in the initial organ image 51, as described above, may refer to a plurality of vertices or specific location included in the initial organ image 51, and the plurality of points included the extracted image may refer to points included in a boundary between an internal area and an external area of the organ in the extracted image.

In general, the organ image refining unit 2222 generates image data of the organ image 34 from the initial organ image 51 by minimizing the distance between at least one of the plurality of points included in the initial organ image 51 and at least one of the plurality of points included the extracted image. Referring to FIG. 5, the organ image refining unit 2222 may generate image data of an organ image 34 from the initial organ image 51 by minimizing a distance $d_1$ between a point 511 included in the initial organ image 51 and a point 322 included in the extracted image 32. Alternatively, as shown in FIG. 5, the organ image refining unit 2222 may generate image data of the organ image 34 from the initial organ image 51 by minimizing a distance between a point 512 included in the initial organ image 51 and a point 323 included in the extracted image 32. Here, the points 322 and 323 included in the extracted image 32 may correspond to a point included in a boundary of a liver in the extracted image 32, and the points 511 and 512 included in the initial organ image 51 may refer to points included in a boundary of a liver in the initial organ image 51.

According to another example, the organ image refining unit 2222 generates image data of the organ image 34 from the initial organ image 51 based on a correspondence relationship between at least one internal structure constituting the initial organ image 51 and at least one internal structure constituting the extracted image 32. Also, the organ image refining unit 2222 may generate image data of the organ image 34 from the initial organ image 51 based on a correspondence relationship between at least one anatomical characteristic constituting the initial organ image 51 and at least one anatomical characteristic constituting the extracted image 32.

The organ image refining unit 2222 may generate image data of the organ image 34 from the initial organ image 51 by minimizing a distance between at least one point constituting an internal structure of the initial organ image 51 and at least one point constituting an internal structure of the extracted image 32. Referring to FIG. 5, the organ image refining unit 2222 may generate image data of the organ image 34 from the initial organ image 51 by minimizing a distance $d_2$ between a point 513 on the initial organ image 51 and a point 324 on the extracted image 32. The point 324 on the extracted image 32 may correspond to a point included in an internal structure of the liver or a point included in the anatomical characteristic of the extracted image 32, and the point 513 may refer to a point included in an internal structure of the liver or a point included in the anatomical characteristic of the initial organ image 51.

In another example, the organ image refining unit 2222 may generate image data of the organ image 34 from the initial organ image 51 based on elasticity information of at least one point constituting the initial organ image 51. The elasticity information may include an elasticity of each tissue of an organ corresponding to at least one point constituting the initial organ image 51. In general, different tissues, such as blood vessels, soft tissues, etc., inside the organ have different elasticity, and the organ image refining unit 2222 may generate image data of the organ image 34 from the initial organ image 51 by depicting the difference in elasticity of various tissues. To generate the image data of the organ image 34 from the initial organ image 51 by depicting the difference in elasticity between tissues, an elastic deformed model-based matching method may be used. The elastic deformed model-based matching method may involve using a difference in elasticity between tissues in model deformation. For example, the organ image refining unit 2222 may determine elastic energy through a displacement between a plurality of points (for example, vertices) constituting the initial organ image 51, and generates image data of the organ image 34 from the initial organ image 51 based on points having minimized elastic energy. For instance, the organ image refining unit 2222 may determine another vertex constituting the initial organ image 51 capable of minimizing elastic energy of any one vertex constituting the initial organ image 51 and generate image data of the organ image 34 from the initial organ image 51 through a process of moving a position of the any one vertex to a position of the another vertex.

In another example, the organ image refining unit 2222 may generate image data of the organ image 34 from the initial organ image 51 based on at least two of: the distance between the at least one of the points included in the initial organ image 51 and the at least one of the points included the extracted image 32, the correspondence relationship between the at least one internal structure constituting the initial organ image 51 and the at least one internal structure constituting the extracted image 32, and the elasticity information of at least one point constituting the initial organ image 51. For instance, the organ image refining unit 2222 may generate image data of the organ image 34 from the initial organ image 51 by combining the above-described examples. The organ image refining unit 2222 may also generate image data of the organ image 34 from the initial organ image 51 by applying different weights to the result obtained according to the above-described examples.

According to another example, the organ image refining unit 2222 may define a first energy function representing a distance between at least one of the points included in the initial organ image 51 and at least one of the points included the extracted image 32, a second energy function representing a difference between at least one internal structure constituting the initial organ image 51 and at least one internal structure constituting the extracted image 32, and a third energy function representing elastic energy according to elasticity information regarding at least one point constituting the initial organ image 51, and generates image data of the organ image 34 from the initial organ image 51 in consideration of the first to third energy functions.

The organ image refining unit 2222 may generate image data of the organ image 34 from the initial organ image 51 through a process of searching vertices in the organ image 34 that correspond to vertices in the initial organ image 51. For instance, the organ image refining unit 2222 may search for new vertices that minimize energy functions defined by the vertices of the initial organ image 51 and determines the new vertices to be the vertices constituting the organ image 34, which is represented by Equation 1. Here, v denotes a position (for example, a coordinate) of each of the vertices of the initial organ image 51, v' denotes a position (for example, a coordinate) of each of the new vertices, and E denotes an energy function.

$$v' = \mathop{\mathrm{argmin}}_{v} E(v) \qquad (1)$$

The energy function E of Equation 1 may be analyzed through combination of the first to third energy functions. Accordingly, the energy function E of Equation 1 is represented by Equation 2. Here, $E_1$ denotes the first energy function, $E_2$ denotes the second energy function, and $E_3$ denotes the third energy function.

$$E(v)=E_1(v)+E_2(v)+E_3(v) \qquad (2)$$

Also, the first to third energy functions are represented by Equation 3. Here, $a_1$, $a_2$, and $a_3$ are constants, $d_1(v)$ denotes a distance between at least one vertex of the initial organ image 51 and at least one point (for example, a point constituting a boundary of the extracted image 32 or a point constituting the internal structure of the extracted image 32) of the extracted image 32, $d_2(v_{feature})$ denotes a distance between at least one vertex of the initial organ image 51 and at least one point (for example, the point constituting the internal structure of the extracted image 32) of the extracted image 32, k denotes an elasticity of an edge connected to the at least one vertex of the initial organ image 51, and $\Delta v$ denotes a variation of the at least one vertex of the initial organ image 51.

$$E_1(v)=a_1\Sigma\|d_1(v)\|^2,$$

$$E_2(v)=a_2\Sigma\|d_2(v_{feature})\|^2,$$

$$E_3(v)=a_3\Sigma k(v)\|\Delta v\|^2 \qquad (3)$$

Figure 6:
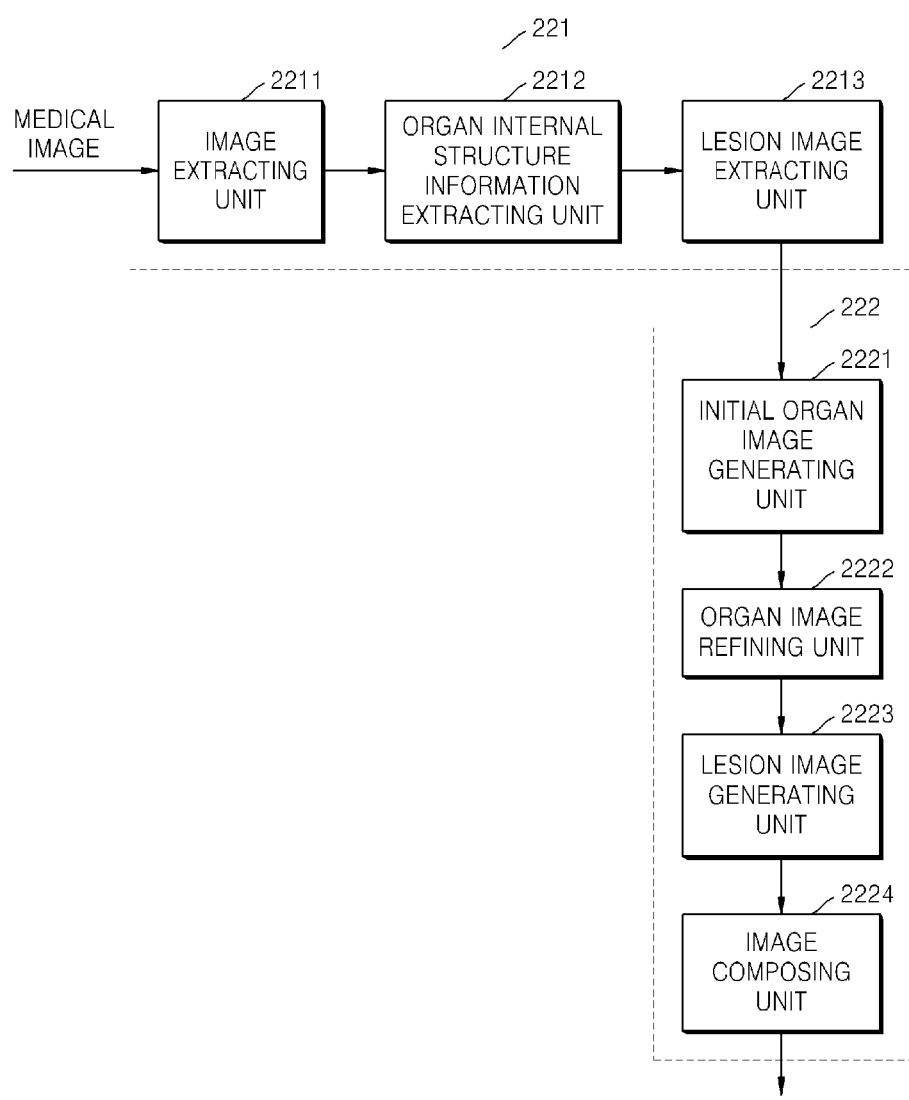
FIG. 6 is a diagram illustrating an example of an organ image extracting unit and an example of an organ image generating unit.

FIG. 6 is a diagram illustrating an example of an organ image extracting unit 221 and an example of an organ image generating unit 222. Referring to FIG. 6, the organ image extracting unit 221 includes an image extracting unit 2211, an organ internal structure information extracting unit 2212, and a lesion image extracting unit 2213. The image extracting unit 2211 illustrated in FIG. 6 extracts an image showing an organ of the internal body of the subject 40, and the organ internal structure information extracting unit 2212 extracts at least one internal structure constituting an organ based on a medical image. The features of the image extracting unit 2211 and the organ internal structure information extracting unit 2212 are the same as or may be inferred from the features of the image extracting unit 2211 and the organ internal structure information extracting unit 2212 described in reference to FIG. 3; thus, the above description in reference to FIG. 3 applies to the image extracting unit 2211 and the organ internal structure information extracting unit 2212, and will not be repeated here.

The lesion image extracting unit 2213 extracts a lesion image showing a lesion inside an organ. The lesion may refer to a pathological variation of the body. The lesion may also refer to an abnormal tissue distinguished from normal tissues inside the body, or a tissue that is in an abnormal state. For example, when the organ is a liver, the lesion may be a cyst, calcification, a tumor, or the like in the liver.

The lesion image extracting unit 2213 extracts a lesion image showing a lesion inside the organ from a medical image. The lesion image refers to an image showing only a region of a lesion from the medical image. For example, when the organ is a liver, the lesion image may refer to an image showing an internal region of a tumor inside the liver or a boundary between the internal region and an external region of the tumor. The lesion image extracting unit 2213 determines a type of the lesion before extracting the lesion image from the medical image. For instance, the lesion image extracting unit 2213 may determine the lesion from the medical image by analyzing the medical image. For example, when the organ included in the medical image is a liver, the lesion image extracting unit 2213 may extract an image showing a tumor inside the liver from the medical image. The lesion image extracting unit 2213 may use sample data transmitted from the storage unit 23 to analyze the medical image or perform a learning process involving a repetitive operation. The learning process involving a repetitive operation refers to a process of identifying the image showing the tumor inside the liver from the input medical image by continuously performing an operation with respect to the same tumor, which is a lesion inside the liver.

The lesion image extracting unit 2213 may determine a lesion inside an organ based on a default value or a command that is provided from a user via the user interface 25. For example, when the default value or the command input from the user interface 25 indicates a tumor to be inside a liver, the lesion image extracting unit 2213 may extract an image showing the tumor inside the liver from the medical image. For example, the command input from the user interface 25 may include region information that is provided by a user. The region information may include geometric information defining a region that is defined by the user's input. For example, when the user inputs a region indicating the tumor inside the liver from the medical image through the user interface 25, area information provided by the user may be transmitted to the lesion image extracting unit 2213. For instance, the lesion image extracting unit 2213 may extract an image showing the lesion from the medical image based on the region information provided by the user's input. According to one example, a user may specify the region information by applying a region growing method after selecting a partial region in the medical image via the user interface 25, or may specify the region information by performing a graph cut on a medical image by selecting an organ from an image that includes other organs and tissues. In performing a graph cut, a user may input an area via the user interface 35, and the region information can be determined by applying a probability distribution with respect to a seed region and information regarding a distance between each point in the medical image and the seed region, considering the smoothness of transitions with respect to various visual values between neighboring points, including brightness, color, contrast and the like. For example, in a 2D image, the neighboring points may correspond to each pixel; in a 3D image, the neighboring points may correspond to each voxel.

Referring to FIG. 6, the organ image generating unit 222 includes the initial organ image generating unit 2221, the organ image refining unit 2222, a lesion image generating unit 2223, and an image composing unit 2224. Referring to FIG. 6, the initial organ image generating unit 2221 may receive image data of the image 32 showing an organ and the generic image 33 and generates an initial organ image from the generic image 33. The organ image refining unit 2222 may generate image data of the organ image 34 from the initial organ image. The features of an initial organ image generating unit 2221 and an organ image refining unit 2222 are the same as or may be inferred from the above description of the initial organ image generating unit 2221 and the organ image refining unit 2222 of FIG. 3; thus, the description with respect to FIG. 3 applies to the various units of FIG. 6, which will not be repeated here for conciseness.

The lesion image generating unit 2223 generates image data of a lesion image based on an extracted image of a lesion. The lesion image may refer to an image that is obtained by newly modeling a lesion based on the extracted image of the lesion. The lesion image may be configured as a 3D volume image. However, the lesion image is not limited to the 3D volume image, and the lesion image may be a 2D image. Since the lesion image is extracted from a medical image of the subject 40, similar to the above-described organ image, the lesion image reflects an actual characteristic of an organ of the subject 40. In other words, the lesion image generating unit 2223 may generate the lesion image to which a characteristic of a lesion inside the organ of the subject 40 is reflected from the extracted image reflecting the actual characteristic of the lesion inside the organ of the subject 40. For example, when the organ is a liver and the lesion is a tumor inside the liver, the lesion image generating unit 2223 may generate a lesion image to which a characteristic of the tumor inside the liver of the subject 40 is reflected based on an image of the tumor inside the liver of the subject 40 that is extracted from the medical image. In the event that a lesion, for example a tumor, has a spherical shape, the lesion image may be modeled in the form of a lump reflecting a morphological characteristic of the lesion. Also, the lesion image may be modeled as a mesh model similar to the above-described organ image. The image data of the lesion image may further include elasticity information representing a difference in elasticity between different types of lesions. For example, the calcification of a tissue results in an area having elasticity that is quite different from that of a cyst; thus, elasticity information of a lesion image reflecting a calcification of a tissue may be depicted in a different way from the elasticity information of a lesion image reflecting a cyst. Also, the image data of the lesion image may further include elasticity information representing a difference in elasticity between tissues inside the lesion.

The image composing unit 2224 composes a lesion image with an organ image. The image composing unit 2224 may compose the organ image with the lesion image based on image data of the organ image and image data of the lesion image. For example, the image composing unit 2224 may allow the organ image to overlap with the lesion image in order to compose the organ image with the lesion image. In another example, the image composing unit 2224 may configure a new organ image by using the image data of the organ image and the image data of the lesion image in order to compose the organ image and the lesion image. Intensity of each of a plurality of pixels and/or voxels constituting the new organ image may be determined according to intensity of each of a plurality pixels and a plurality of voxels constituting the organ image and intensity of each of a plurality pixels and a plurality of voxels constituting the lesion image. Also, the pixels and the voxels may refer to vertices of a mesh model. The image composing unit 2224 may compose the organ image and the lesion image in consideration of a relative position relationship between the organ image and the lesion image. Also, as described above, the organ image may include a mesh model including an organ, an internal structure of the organ, and an anatomical characteristic, and edges between vertices may include elasticity information. The lesion image may also include a mesh model showing a lesion, and edges between vertices of the mesh model may include elasticity information.

Figure 7:
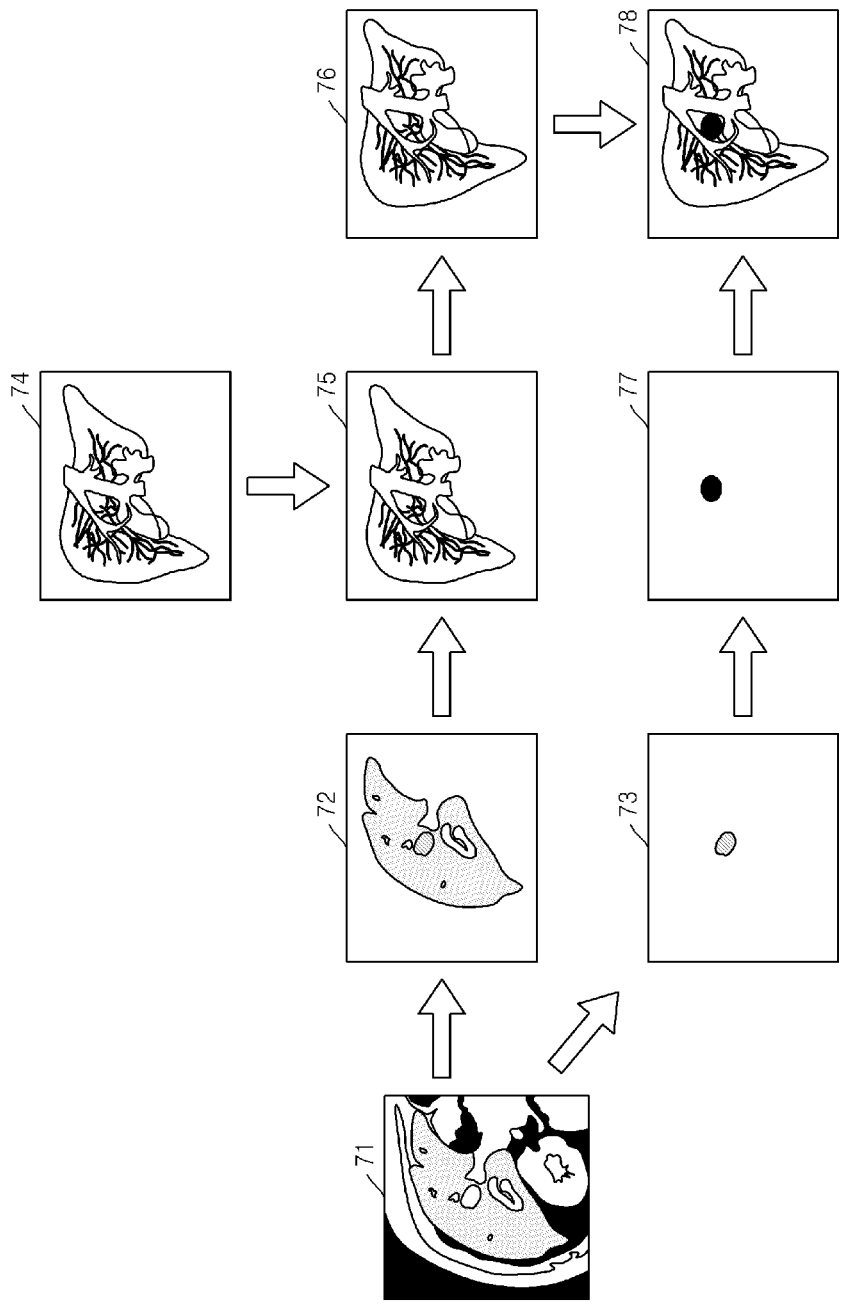
FIG. 7 is a diagram illustrating an example of a process of generating an organ image based on a medical image and a generic image.

FIG. 7 illustrates an example of a process of generating an organ image 78 based on a medical image 71 and a generic image 74. Referring to FIGS. 6 and 7, the image extracting unit 2211 may extract an image 72 showing an organ from a medical image 71, and the lesion image extracting unit 2213 may extract an image 73 showing a lesion from the medical image 71. The initial organ image generating unit 2221 may generate an initial organ image 75 from a generic image 74 based on an extracted image 72; the organ image refining unit 2222 may generate an organ image 76 from the initial organ image 75; and the lesion image generating unit 2223 may generate a lesion image 77 from the extracted image 73. Referring to FIGS. 6 and 7, the image composing unit 2224 may compose the organ image 76 with the lesion image 77. Accordingly, the organ image 78 to be output shows an internal structure and a lesion of an organ as well as an outer boundary of the organ. For example, when the organ image 78 is an organ image showing a liver of the internal body of the subject 40, the organ image 78 may show blood vessels inside the liver, an internal structure, such as different lobes of the liver, and a lesion, such as a cyst, calcification, or a tumor, as well as the outer boundary of the liver. As described above, in diagnosing a patient, accuracy and efficiency may be greatly increased by using the organ image 78. The description regarding how the specific internal structures are determined with respect to FIGS. 1 to 6 applies to FIG. 7.

Figure 8:
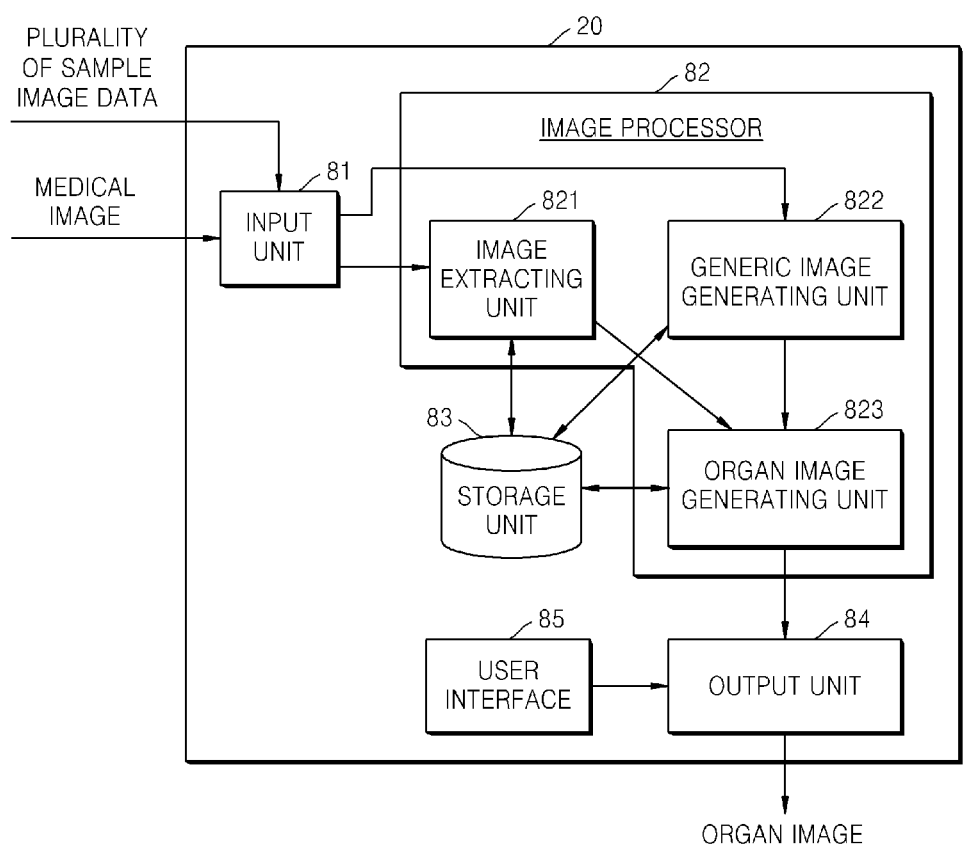
FIG. 8 is a diagram illustrating an example of an organ image generating apparatus illustrated in FIG. 1.

FIG. 8 is a diagram illustrating another example of an organ image generating apparatus 20 illustrated in FIG. 1. Referring to FIG. 8, the organ image generating apparatus 20 includes an input unit 81, an image processor 82, a storage unit 83, an output unit 84, and a user interface 85. Operations of the storage unit 83, the output unit 84, and the user interface 85 of FIG. 8 correspond to those of the storage unit 23, the output unit 24, and the user interface 25 of the organ image generating apparatus 20 shown in FIG. 2; thus, the detailed description of the storage unit 23, the output unit 24, and the user interface 25 with respect to FIG. 2 applies to the storage unit 83, the output unit 84, and the user interface 85 of FIG. 8, and will not be repeated here for conciseness. However, the input unit 81 of FIG. 8 may differ from the input unit 21 of FIG. 2 in certain aspects. For example, the input unit 81 may not receive image data of a generic image, and instead may receive a plurality of sample image data. In addition, the input unit 81 may transmit the sample image data to a generic image generating unit 822. In this regard, the input unit 21 may receive the sample image data from the medical image generating apparatus 10 or an external another apparatus. The features of the input unit 81, other than the differences between the input unit 81 and the input unit 21 pointed out in the description, is the same as the features of the input unit 21 provided above with respect to FIG. 2. Since the above description regarding the input unit 21 of FIG. 2 applies to the input unit 81, the description will not be repeated here.

Referring to FIG. 8, the image processor 82 includes an image extracting unit 821, a generic image generating unit 822, and an organ image generating unit 823. Operations of the image extracting unit 821 correspond to those of the image extracting unit 221 of the organ image generating apparatus 20 shown in FIG. 2; thus, the above description with respect to FIG. 2 also applies to FIG. 8, and will not be repeated here. Also, operations of the organ image generating unit 823 correspond to those of the organ image generating unit 222 of the organ image generating apparatus 20 shown in FIG. 2; thus, the description with respect to FIG. 2 applies to the organ image generating unit 823 of FIG. 8. However, the organ image generating unit 823 may receive a generic image from the generic image generating unit 822, unlike the organ image generating unit 222 that receives the generic image from the input unit 21.

The generic image generating unit 822 may generate the generic image based on the plurality of sample image data. For instance, the generic image generating unit 822 may receive the sample image data from the input unit 21 or may extract the sample image data from the storage unit 83. The generic image refers to a representative image showing a specific organ of the internal body. For example, the generic image may refer to a representative image of a liver of the internal body. In general, the generic image is formed from a plurality of sample image data through a statistical learning method. A statistical learning method may include a statistical modeling method.

A statistical learning method may involve generating the representative image based on the plurality of sample image data. Examples of the statistical learning method include an ASM, an AAM, a SSM, and the like. The ASM refers to a statistical model of the shape of objects that are repeatedly deformed to show a representative image of the object in a new image. The AAM refers to a computer image algorithm for matching a statistical model of object shape and appearance to a new image. The SSM refers to a geometrical analysis from a set of statistical shapes that are measured to describe geometrical properties from similar shapes or different groups. The ASM, the AAM, and the SSM are not limited to the above-described definitions.

In general, the generic image may be comprised of a base vector represented by a mean shape and a variation. Also, the generic image may be comprised of a mesh model, and the mean shape may be comprised of the mesh mode. In general, the mesh model refers to a model image that is represented by vertices, edges, and surfaces such as a triangle. Also, as described above, the generic image is formed of a plurality of sample image data. The generic image may be formed in such a manner that it shows an internal structure of an organ as well as an outer boundary of the organ. The generic image may further include information regarding an outer boundary, information regarding an internal structure, or anatomical characteristic information regarding an organ and the internal structure. The information regarding the outer boundary, the information regarding the internal structure, or the anatomical characteristic information regarding the organ and the internal structure are semantic information, and may be included in image data of the generic image.

The features of the organ image generating apparatus 20 shown in FIG. 8 are described above with reference to FIGS. 1 to 7, and will not be repeated here for conciseness.

Figure 9:
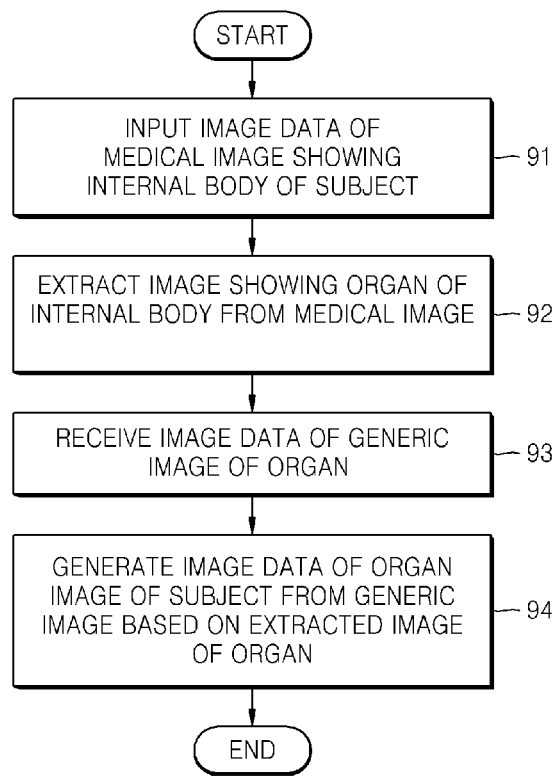
FIG. 9 is a flowchart illustrating an example of an organ image generating method.

FIG. 9 is a flowchart showing an example of an organ image generating method. The organ image generating method of FIG. 9 includes operations that may be sequentially performed by an organ image generating apparatus 20. As such, the description of the organ image generating apparatus 20 with respect to FIG. 2 may apply to the organ image generating method of FIG. 9.

In operation 91, the input unit 21 receives image data of a medical image showing an internal body of a subject. In operation 92, the organ image extracting unit 221 extracts an image showing an organ of the internal body from the medical image. In operation 93, the input unit 21 receives image data of a generic image of an organ determined from a plurality of sample image data. In operation 94, the organ image generating unit 222 generates image data of an organ image of the subject from the generic image based on the extracted image.

Figure 10:
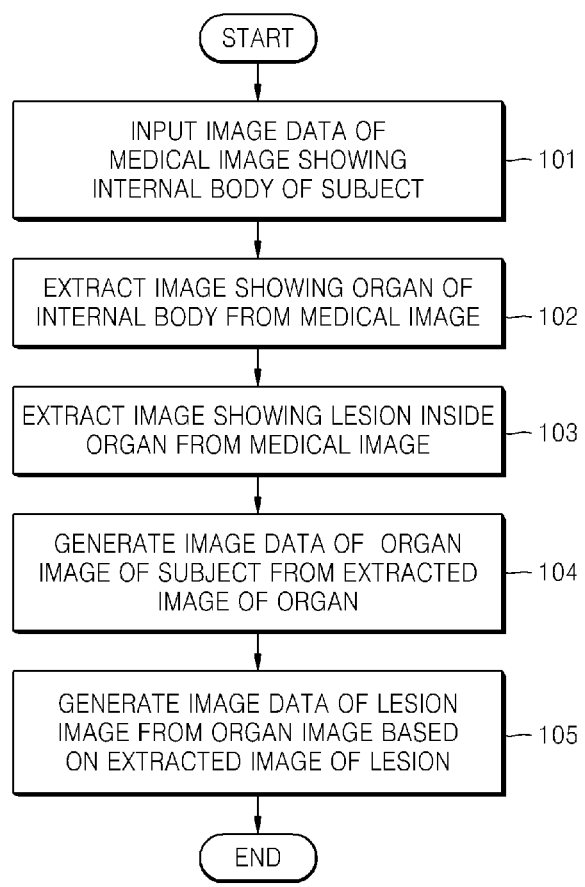
FIG. 10 is a flowchart illustrating another example of an organ image generating method.

FIG. 10 is a flowchart showing another example of an organ image generating method. The organ image generating method includes operations that may be sequentially performed by the organ image generating apparatus 20 of FIG. 2. Accordingly, a detailed description of the organ image generating apparatus 20 of FIG. 2 may apply to the organ image generating method of FIG. 10.

In operation 101, the input unit 21 receives image data of a medical image showing an internal body of a subject. In operation 102, the organ image extracting unit 221 extracts an image showing an organ of the internal body from the medical image. In operation 103, the organ image extracting unit 221 extracts a lesion image showing a lesion inside the organ from the medical image. In operation 104, the organ image generating unit 222 generates image data of an organ image of the subject from the extracted image. In operation 105, the organ image generating unit 222 generates image data of a lesion image composed with the organ image based on the extracted image of lesion.

The organ image generating method described with reference to FIGS. 9 and 10 can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and etc.

According to a method and apparatus for generating an organ image described herein, by generating an organ image of a subject to which a characteristic of an organ of the subject is reflected from a generic image of the organ determined according to a plurality of sample image data, the organ image having a higher quality to which a structural characteristic of the organ of the internal body of a patient is reflected can be obtained. Also, an organ image that accurately shows a lesion inside an organ as well as the organ of the internal body can be obtained by composing the organ image with a lesion image.

Units, modules and apparatuses described herein may be implemented using hardware components and software components. For example, a unit or an apparatus may be implemented with a processing device. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

As used herein, a processing device configured to implement a function A includes a processor programmed to run specific software. In addition, a processing device configured to implement a function A, a function B, and a function C may include configurations, such as, for example, a processor configured to implement both functions A, B, and C, a first processor configured to implement function A, and a second processor configured to implement functions B and C, a first processor to implement function A, a second processor configured to implement function B, and a third processor configured to implement function C, a first processor configured to implement function A, and a second processor configured to implement functions B and C, a first processor configured to implement functions A, B, C, and a second processor configured to implement functions A, B, and C, and so on.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An organ image generating method, the method comprising:
    receiving a medical image of a subject;
    extracting an image representing an organ from the medical image;
    receiving a generic image of the organ, the generic image being formed from a plurality of sample images of the organ; and
    generating an organ image of the subject by transforming the generic image to reflect a morphological characteristic of the organ of the subject represented in the extracted image.

2. The method of claim 1, wherein the extracting of the image representing the organ comprises:
    extracting an image comprising a boundary between an inner area and an outer area of the organ from the medical image; and
    extracting organ internal structure information of at least one internal structure of the organ from the medical image.

3. The method of claim 2, wherein the generating of the organ image of the subject comprises transforming the generic image into the organ image according to the extracted organ internal structure information.

4. The method of claim 3, wherein the extracting of the organ internal structure information comprises further extracting anatomical characteristic information showing an anatomical characteristic of the organ based on the organ internal structure information, and the generating the organ image of the subject comprises transforming the generic image into the organ image of the subject according to the extracted organ internal structure information and the extracted anatomical characteristic information.

5. The method of claim 1, wherein the generating of the organ image of the subject comprises:
    generating an initial organ image of the subject from the generic image based on the extracted image; and
    generating the organ image from the initial organ image in consideration of a difference in morphological characteristic between the extracted image and the initial organ image.

6. The method of claim 5, wherein the generating of the organ image from the initial organ image comprises generating the organ image from the initial organ image based on a distance between at least one of a plurality of points included in the initial organ image and at least one of a plurality of points included in the extracted image.

7. The method of claim 5, wherein the generating of the organ image from the initial organ image comprises generating the organ image from the initial organ image based on a correspondence relationship between at least one internal structure included in the initial organ image and at least one internal structure included in the extracted image.

8. The method of claim 5, wherein the generating of the organ image from the initial organ image comprises generating the organ image from the initial organ image based on a difference in elasticity information of tissues included in the initial organ image.

9. The method of claim 8, wherein the elasticity information comprises an elasticity of each tissue of an organ corresponding to at least one point included in the initial organ image.

10. The method of claim 1, wherein the generic image is formed from a plurality of sample images according to a statistical modeling method.

11. The method of claim 1, wherein the organ image generating method further comprises:
    extracting an image of a lesion inside the organ from the medical image; and
    generating a lesion image from the organ image and the extracted image of lesion.

12. The method of claim 11, wherein the organ image generating method further comprises generating the organ image with the lesion image by synthesizing the organ image and the lesion image.

13. The method of claim 11, wherein the generating of the lesion image further comprises generating the lesion image based on elasticity information of at least one point on the organ image and elasticity information of at least one point on the lesion image.

14. A non-transitory computer-readable medium storing instructions that, when executed by a processor, cause the processor to perform the method of claim 1.

15. An organ image generating apparatus, comprising:
an input unit configured to receive a medical image of a subject and a generic image of an organ, the generic image of the organ being formed from a plurality of sample images of the organ;
an image processor configured to extract an image representing an organ from the medical image and to generate an organ image of the subject by transforming the generic image according to morphological characteristics of the extracted image and
an output unit configured to output the organ image.

16. The organ image generating apparatus of claim 15, wherein the image processor comprises:
an organ image extracting unit configured to extract the image representing the organ from the medical image;
a generic image generating unit configured to generate the generic image of the organ by using a plurality of sample images of the organ; and
an organ image generating unit configured to generate the organ image of the subject by transforming the generic image according to morphological characteristics of the extracted image.

* * * * *